(12) United States Patent
Hasegawa

(10) Patent No.: US 12,717,401 B2
(45) Date of Patent: Aug. 25, 2026

(54) VIRTUAL REALITY SYSTEM

(71) Applicant: CANON KABUSHIKI KAISHA, Tokyo (JP)

(72) Inventor: Yuya Hasegawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 18/513,321

(22) Filed: Nov. 17, 2023

(65) Prior Publication Data

US 2024/0168543 A1 May 23, 2024

(30) Foreign Application Priority Data

Nov. 21, 2022 (JP) ................................ 2022-185373

(51) Int. Cl.

| | |
|---|---|
| ***G06F 3/12*** | (2006.01) |
| ***G06F 3/01*** | (2006.01) |
| ***G06F 3/0482*** | (2013.01) |
| ***G06F 3/14*** | (2006.01) |
| ***H04N 1/00*** | (2006.01) |
| ***H04N 1/34*** | (2006.01) |

(52) U.S. Cl.

CPC ........... *G06F 3/011* (2013.01); *G06F 3/0482* (2013.01); *H04N 1/00244* (2013.01); *H04N 1/00246* (2013.01); *H04N 1/00344* (2013.01); *H04N 1/00503* (2013.01); *H04N 1/00954* (2013.01); *H04N 1/34* (2013.01)

(58) Field of Classification Search

CPC ... G06F 3/011; G06F 3/0482; H04N 1/00244; H04N 1/00246; H04N 1/00344; H04N 1/00503; H04N 1/00954; H04N 1/34

See application file for complete search history.

(56) References Cited

U.S. PATENT DOCUMENTS 6,917,440 B2 * 7/2005 Kondo ............... H04N 1/00196 358/1.14
2013/0024913 A1 * 1/2013 Lim ...................... G06F 3/1239 726/4

(Continued)

FOREIGN PATENT DOCUMENTS

JP 2014085953 A 5/2014

*Primary Examiner* — Stephen S Hong
*Assistant Examiner* — Darrin Hope
(74) *Attorney, Agent, or Firm* — Canon U.S.A., Inc. IP Division

(57) ABSTRACT

A virtual reality system includes a virtual reality headset including a display device that displays at least a virtual reality video and an imaging device that captures images at a predetermined range including view of a user, a virtual video server configured to control the virtual reality video, an image forming apparatus, and a management server configured to communicate with the image forming apparatus and the virtual video server, wherein the virtual reality headset enables a user interface relating to operations on the image forming apparatus to be operated without satisfaction of a predetermined condition in a state where a use permission is obtained in the management server, and wherein the virtual reality headset enables the user interface relating to operations on the image forming apparatus to be operated based on satisfaction of the predetermined condition in a state where the use permission is not obtained in the management server.

14 Claims, 15 Drawing Sheets

(56) References Cited

U.S. PATENT DOCUMENTS

| | | | | |
|---|---|---|---|---|
| 2015/0138595 | A1* | 5/2015 | Sugimoto | H04N 1/00286 358/1.15 |
| 2018/0158242 | A1* | 6/2018 | Sugawara | G06F 3/012 |
| 2018/0183961 | A1* | 6/2018 | Kashiwagi | G06Q 30/0283 |
| 2022/0116505 | A1* | 4/2022 | Inouye | H04N 1/00143 |

* cited by examiner

FIG.1

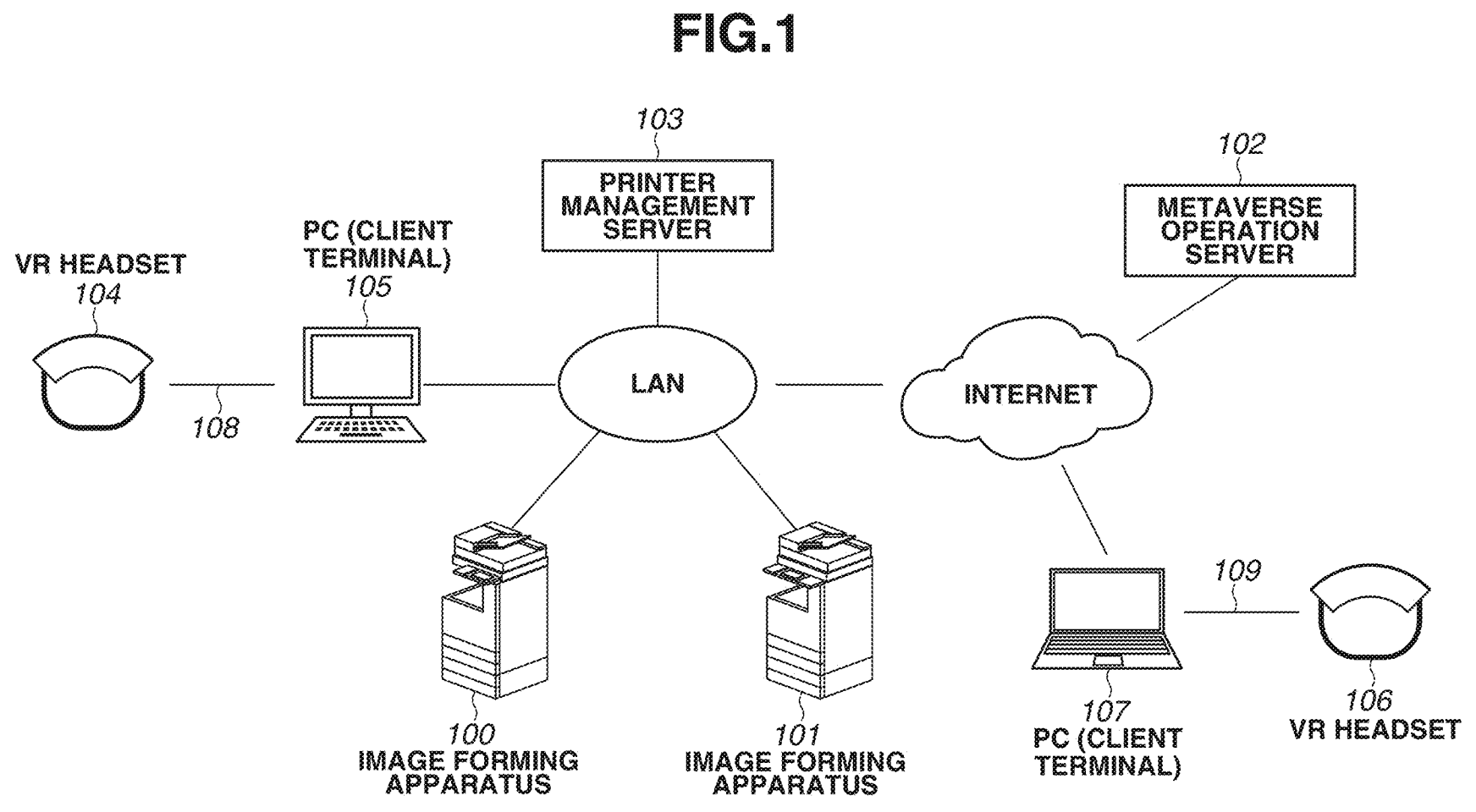

102
METAVERSE OPERATION SERVER

INTERNET

106
VR HEADSET

109

107
PC (CLIENT TERMINAL)

103
PRINTER MANAGEMENT SERVER

LAN

101
IMAGE FORMING APPARATUS

100
IMAGE FORMING APPARATUS

105
PC (CLIENT TERMINAL)

108

104
VR HEADSET

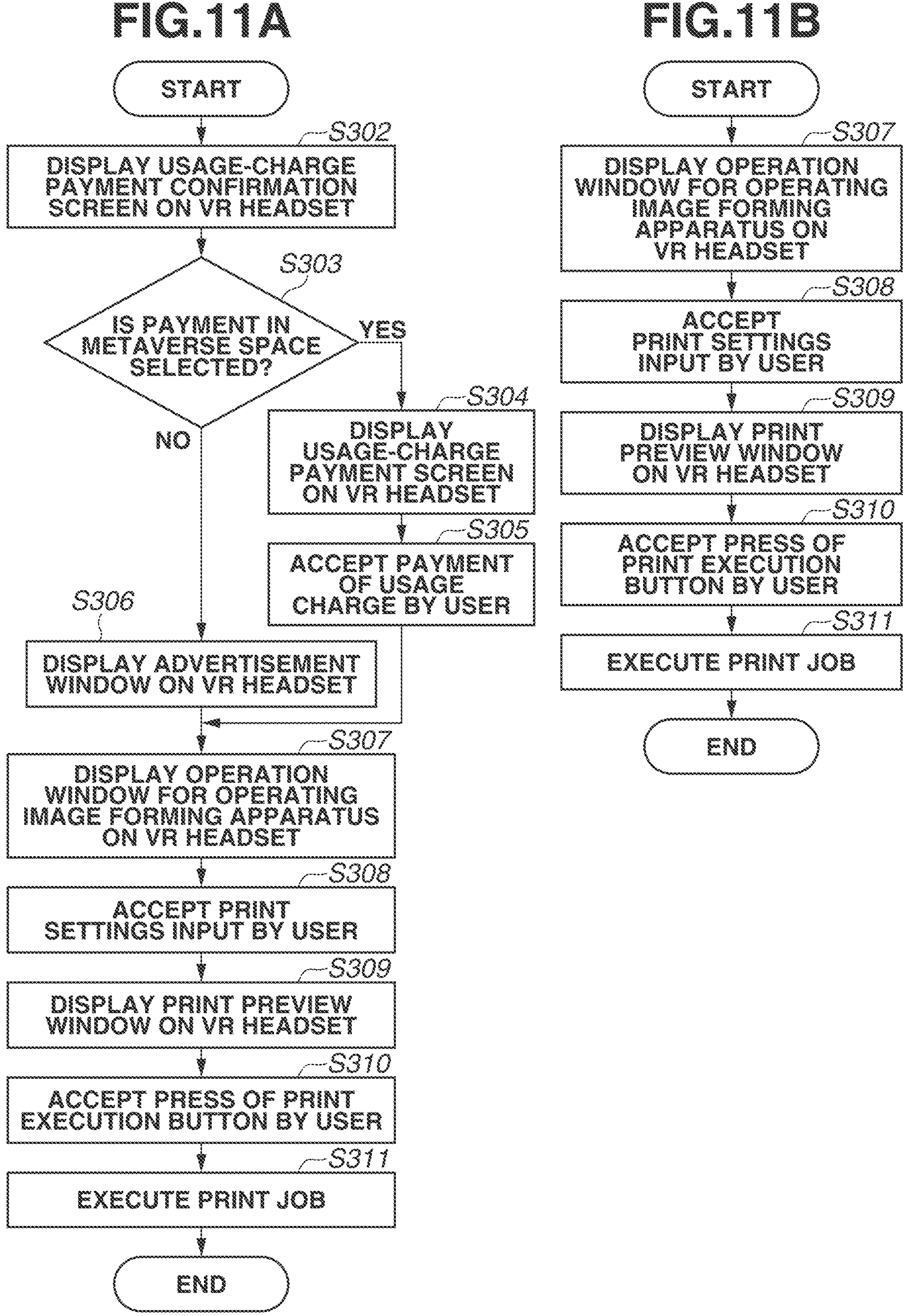
FIG.11A
START
S302
DISPLAY USAGE-CHARGE PAYMENT CONFIRMATION SCREEN ON VR HEADSET
S303
IS PAYMENT IN METAVERSE SPACE SELECTED?
YES
NO
S304
DISPLAY USAGE-CHARGE PAYMENT SCREEN ON VR HEADSET
S305
ACCEPT PAYMENT OF USAGE CHARGE BY USER
S306
DISPLAY ADVERTISEMENT WINDOW ON VR HEADSET
S307
DISPLAY OPERATION WINDOW FOR OPERATING IMAGE FORMING APPARATUS ON VR HEADSET
S308
ACCEPT PRINT SETTINGS INPUT BY USER
S309
DISPLAY PRINT PREVIEW WINDOW ON VR HEADSET
S310
ACCEPT PRESS OF PRINT EXECUTION BUTTON BY USER
S311
EXECUTE PRINT JOB
END
FIG.11B
START
S307
DISPLAY OPERATION WINDOW FOR OPERATING IMAGE FORMING APPARATUS ON VR HEADSET
S308
ACCEPT PRINT SETTINGS INPUT BY USER
S309
DISPLAY PRINT PREVIEW WINDOW ON VR HEADSET
S310
ACCEPT PRESS OF PRINT EXECUTION BUTTON BY USER
S311
EXECUTE PRINT JOB
END SELECT USAGE LICENSE.
META MFP POINTS: 200 pt
1-WEEK PACK: 100 pt
10-TIME PACK: 45 pt
USE ONLY THIS TIME: 5 pt
CREDIT CARD PAYMENT

VIRTUAL REALITY SYSTEM

BACKGROUND

Technical Field

The present disclosure relates to a system that executes print operation of an image forming apparatus in a real space, using an avatar of an image forming apparatus that performs a print process in a metaverse space.

Description of the Related Art

In recent years, metaverses that provide various services in three-dimensional virtual spaces configured on the Internet have begun to spread. A user can access a metaverse space, using a piece of dedicated hardware that supports rendering of virtual objects, such as a head-mounted display or a smart glass, or using a terminal having a built-in program execution environment, such as a personal computer (PC) or a smartphone. Further, the user can use various services provided in the metaverse space, by operating an avatar that is a character representing the user in the metaverse space.

Examples of utilization of the metaverse in business scenes, such as a virtual office to which a user goes and works as an avatar in a metaverse space and a virtual event held in a metaverse space, are increasing. Accordingly, the demand for printing contents, such as a document and an image that can be viewed in a metaverse space, using an image forming apparatus in a real space is expected on the market.

A service in a metaverse space is executed mainly in a metaverse server on the Internet. Besides, a service in a real space can also be executed by making a program available from the metaverse server. For example, a document file created in the metaverse server can be printed on a paper by a printer connected to the Internet, and information scanned by a scanner can be taken into the metaverse server.

Japanese Patent Application Laid-Open No. 2014-85953 discusses a method of transmission and reception of print data between a data server on the Internet such as a metaverse server and an image forming apparatus such as a printer or a multi-function peripheral (MFP). The image forming apparatus appropriately executes print in an environment with security such as a firewall, by changing a method of transmitting and receiving print data, depending on whether a print instruction is received from a company server or from an outside server such as a metaverse server.

In addition, for some of the image forming apparatuses, regular replacement of consumables and repair services for malfunctions are available, based on a maintenance contract made between the administrator and the seller of the image forming apparatus. The maintenance contract can be maintained by regular payment of a contract charge by the administrator of the image forming apparatus. The administrator of the image forming apparatus prevents the risk of the occurrence of consumption of consumables and the occurrence of malfunctions by third parties not having use permissions, by giving use permissions to users who belong to a company or organization to which the administrator belongs.

As a method of giving a use permission to each user beforehand, there is, for example, a method of registering the users in a user list held by the administrator and giving use permissions to all the users included in the user list.

SUMMARY

According to an aspect of the present disclosure, a virtual reality system includes a virtual reality headset including a display device that displays at least a virtual reality video and an imaging device that captures images at a predetermined range including a view of a user, a virtual video server configured to control the virtual reality video, an image forming apparatus, and a management server configured to communicate with the image forming apparatus and the virtual video server, wherein the virtual reality headset enables a user interface relating to operations on the image forming apparatus to be operated without satisfaction of a predetermined condition in a state where a use permission is obtained in the management server, and wherein the virtual reality headset enables the user interface relating to operations on the image forming apparatus to be operated based on satisfaction of the predetermined condition in a state where the use permission is not obtained in the management server.

Further features of the present disclosure will become apparent from the following description of exemplary embodiments with reference to the attached drawings.

BRIEF DESCRIPTION OF THE DRAWINGS

FIG. 1 is a diagram conceptually illustrating a configuration of a virtual reality system relating to an image forming apparatus.

FIGS. 11A and 11B are diagrams each illustrating a flow of display in the VR headset.

DESCRIPTION OF THE EMBODIMENTS

Figure 2:
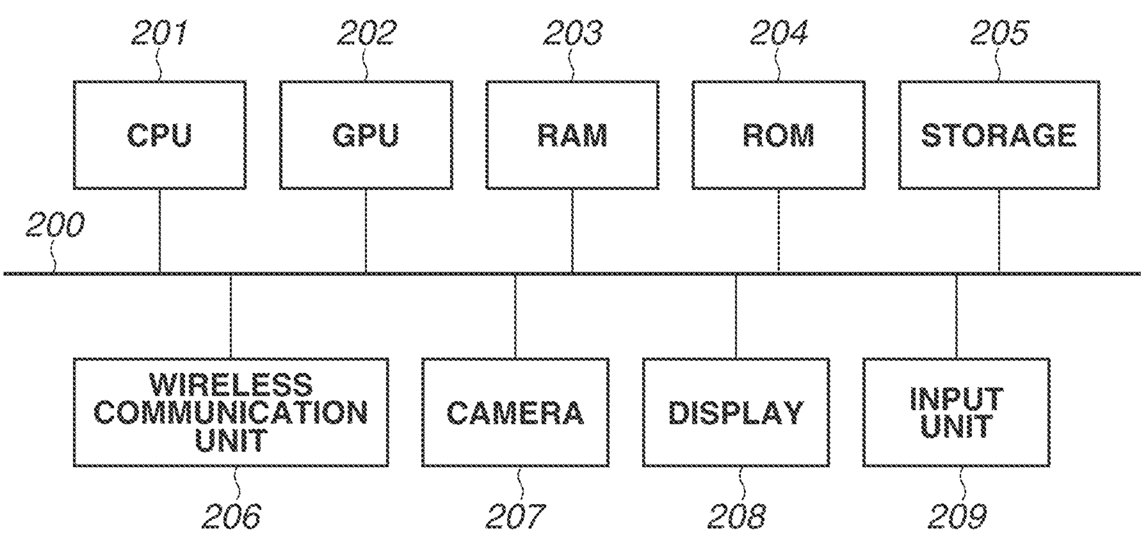
FIG. 2 is a block diagram illustrating a hardware configuration of a virtual reality (VR) headset.

Each of exemplary embodiments of the present disclosure will be described in detail with reference to the attached drawings. The following exemplary embodiments do not limit the present disclosure according to the scope of claims, and not all of combinations of features described in the exemplary embodiments are necessarily required for a solution of the present disclosure. The exemplary embodiments will be described using an image forming apparatus as an example of an information processing apparatus, but are not limited thereto.

Configuration of Image Forming System in Metaverse

A first exemplary embodiment will be described. FIG. 1 is a diagram illustrating an example of a configuration of a virtual reality system relating to an image forming apparatus (i.e., a metaverse system relating to an image forming apparatus). The image forming system in the present exemplary embodiment includes image forming apparatuses 100 and 101, a metaverse operation server 102 (a virtual reality server), a printer management server 103, and personal computers (PCs) 105 and 107 (client terminals), as illustrated in FIG. 1. The PCs 105 and 107 are information processing apparatuses that each execute an application program for a virtual space such as a metaverse space, and may each be a PC, a smartphone, or a tablet.

Each of virtual reality headsets (VR headsets) 104 and 106 is a piece of dedicated hardware that supports rendering of a virtual object such as a metaverse space (a virtual reality video), as represented by a head-mounted display. Short-range communication networks 108 and 109 are each implemented by Bluetooth®, a wireless local area network (LAN), or the like. The VR headsets 104 and 106 are connected to the PCs 105 and 107, respectively, via the short-range communication networks 108 and 109, respectively.

The metaverse operation server 102 (a virtual video server) is connected to the Internet, and the image forming apparatuses 100 and 101, the printer management server 103, and the PC 105 are each connected to a LAN, and further connected to the Internet via the LAN. The PC 107 is connected to the Internet via a communication network implemented by a LAN, a wide area network (WAN), or the like. The metaverse operation server 102 transmits a virtual reality video to the VR headset 104 via the PC 105. The metaverse operation server 102 controls the virtual reality video, by accepting operations on the VR headset 104 via the PC 105.

The image forming apparatuses 100 and 101, the metaverse operation server 102, the printer management server 103, the PCs 105 and 107 can each transmit and receive information, via the Internet and the network such as a LAN or a WAN. The communication is controlled via Hypertext Transfer Protocol (HTTP), Extensible Messaging and Presence Protocol (XMPP), or the like. Other type of protocol may be used as the protocol.

In this configuration, the PC 105 and the VR headset 104 have separate functions, but the VR headset 104 may have all or a part of the information processing capability and the function of connecting with the LAN of the PC 105. The relationship between the PC 107 and the VR headset 106 is similar to the relationship between the PC 105 and the VR headset 104.

Further, in this description, the PC 105 and the image forming apparatus 100 are placed in the same floor or floors close to each other in a real space. A user of the PC 105 can directly operate the image forming apparatus 100, and acquire a printout of the image forming apparatus 100.

Hardware Configuration of VR Headset

FIG. 2 is a diagram illustrating an example of a hardware configuration of each of the VR headsets 104 and 106. The VR headsets 104 and 106 each have a central processing unit (CPU) 201, a graphics processing unit (GPU) 202, a random access memory (RAM) 203, a read only memory (ROM) 204, a storage 205, a wireless communication unit 206, a camera 207, and a display 208.

The CPU 201 controls the entire apparatus. The CPU 201 executes an application program, an operating system (OS), and the like stored in the storage 205, and performs control of temporarily storing information for program execution, a file, and the like into the RAM 203.

The GPU 202 performs arithmetic processing for drawing a virtual object in real time in a space such as a metaverse space.

The RAM 203 is a temporary storage unit, and functions as a main memory, a work area, and the like for the CPU 201 and the GPU 202.

The ROM 204 is a storage unit, and stores various data such as a basic input/output (I/O) program.

The storage 205 is one of external storage units, and functions as a large-capacity memory. The storage 205 stores application programs such as a web browser, programs of a service server group, the OS, and relevant programs. The storage 205 is, for example, a flash memory such as a solid state drive (SSD) or an embedded multimedia card (eMMC).

The wireless communication unit 206 performs various communications with the PCs 105 and 107 and the Internet via the network. The communication method is, for example, a wireless LAN or Bluetooth®. The camera 207 (an image capturing unit) captures a video of a view of a predetermined area, in each of the VR headsets 104 and 106.

The display 208 is a display unit, and can display a virtual object such as a metaverse space, information for an operation, and the like, in each of the VR headsets 104 and 106. The display 208 includes a display for left eye and a display for right eye (neither is illustrated). For the display of the metaverse space, the display content of the display for left eye is perceived by the left eye, the display content of the display for right eye is perceived by the right eye, and the brain of an operator combines those display contents, so that the operator can recognize the display contents three-dimensionally. It is acceptable to use a method in which a video is projected onto a half mirror (not illustrated) of the display 208 and the operator views a virtual screen beyond the half mirror. Alternatively, it is acceptable to use a method in which lasers from a laser irradiation device (not illustrated) are projected onto the retinas of a user and the user thereby recognizes the display contents three-dimensionally.

An input unit 209 is an input means. The VR headsets 104 and 106 each include a microphone and an accessory controller to be used to operate the metaverse, as well as an acceleration sensor, a touch sensor, and an infrared camera sensor that deal with positions and movements.

Software Configuration of VR Headset

Figure 3:
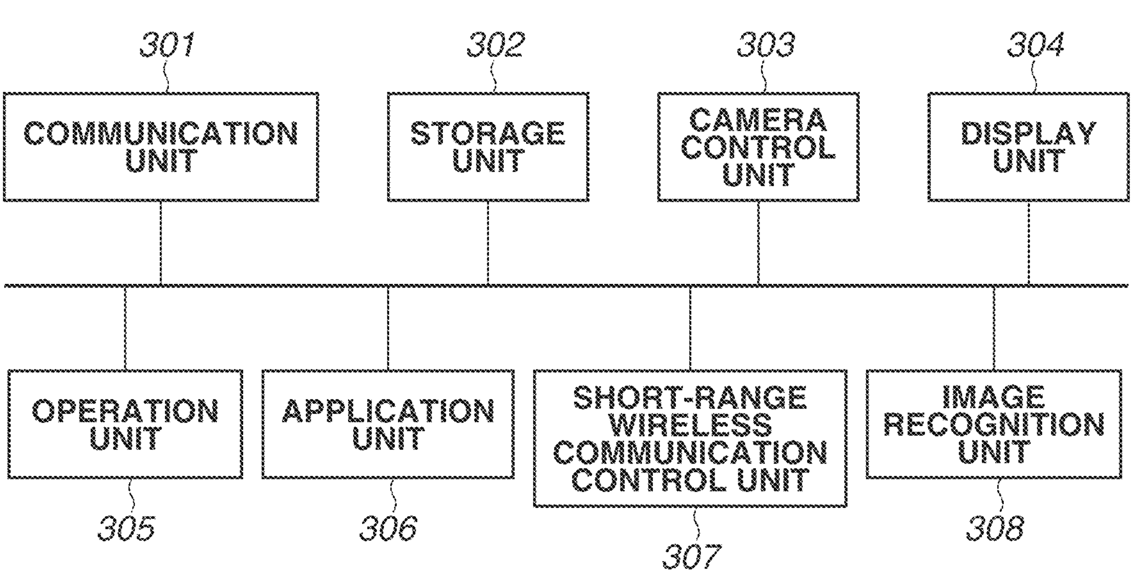
FIG. 3 is a block diagram illustrating a software configuration of the VR headset.

FIG. 3 is a diagram illustrating an example of a software configuration of each of the VR headsets 104 and 106. The software configuration is stored as a program in the ROM 204 described with reference to FIG. 2, and is loaded into the RAM 203 for execution, and executed by the CPU 201.

A communication unit 301 controls the wireless communication unit 206, and transmits and receives data to and from the PCs 105 and 107 and the Internet via the network.

A storage unit 302 controls storage of data for the OS, the web browser, an installed application, and the like activated in each of the VR headsets 104 and 106 into the ROM 204.

A camera control unit 303 controls acceptance of image data acquired from the camera 207.

A display unit 304 displays results of the OS, the web browser, and an application on the display 208. For example, the display unit 304 controls display of information such as a menu for operating the OS.

An operation unit 305 controls acceptance of operations performed by a user in each of the VR headsets 104 and 106 via the input unit 209, gestures of the user performed over the display unit 304, and operations using the accessory controller and the microphone. For example, the operation unit 305 controls display of the web browser caused by physically double-tapping each of the VR headsets 104 and 106, and acceptance of operations such as closing an application. In addition, for the augmented reality (AR) technology, the menu for the OS is projected onto an image in the real world acquired by the camera control unit 303, and the operation unit 305 controls acceptance of operations by the user such as tapping the projected menu by hand to open the menu.

An application unit 306 controls an application installed on the OS of each of the VR headsets 104 and 106. In addition, the application unit 306 stores, into the ROM 204, information such as user information and code information for identifying data used by the application, in cooperation with the storage unit 302.

A short-range wireless communication control unit 307 controls the wireless communication unit 206, and transmits and receives data to and from each of the PCs 105 and 107. In addition, the short-range wireless communication control unit 307 controls acquisition of information about a peripheral device by local communication, and transmission and reception of data to and from the peripheral device. Further, the short-range wireless communication control unit 307 transmits and receives data to and from the peripheral device in cooperation with the application unit 306, in a case where short-range wireless communication is performed from the application.

Hardware Configuration of Image Forming Apparatus

Figure 4A:
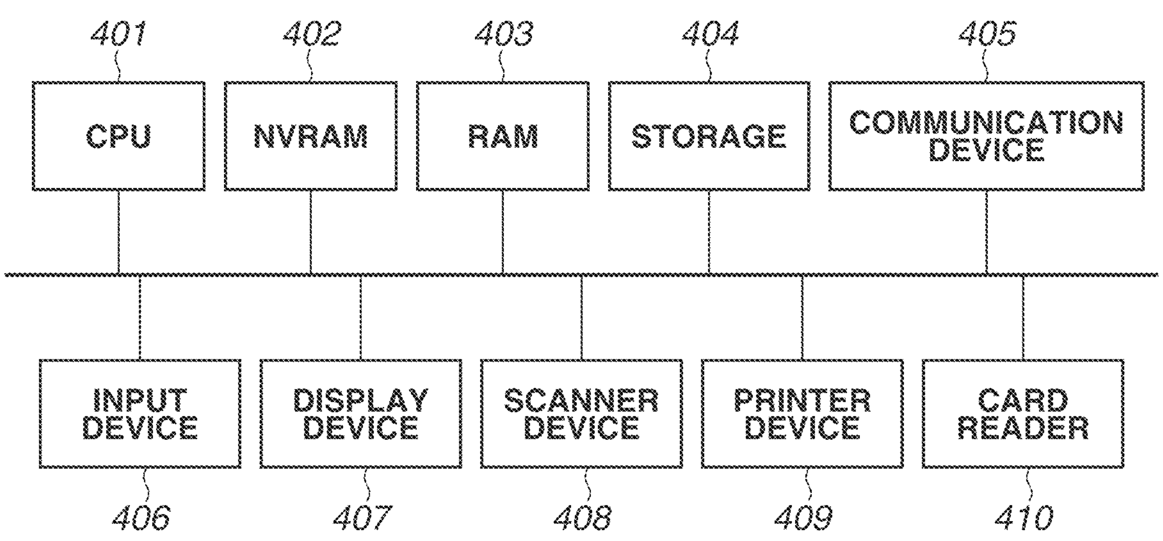
FIG. 4A is a block diagram illustrating a hardware configuration of the image forming apparatus.
Figure 4B:
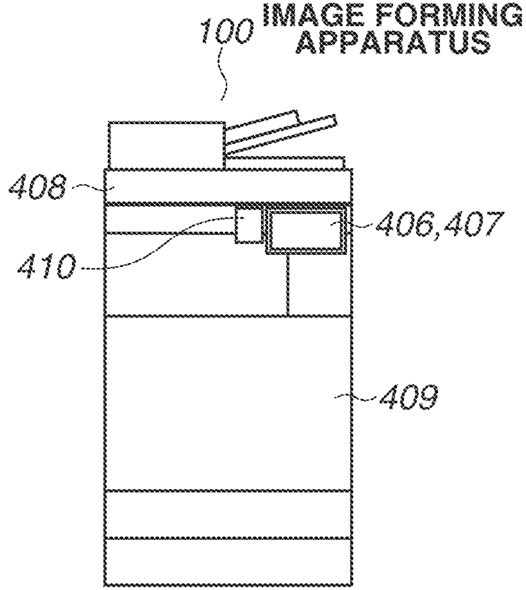
FIG. 4B is an external view of the image forming apparatus.

FIGS. 4A and 4B are diagrams illustrating an example of a hardware configuration of the image forming apparatus 100. FIG. 4A is a block diagram, and FIG. 4B is an external view.

The image forming apparatus 100 includes a CPU 401, a non-volatile RAM (NVRAM) 402, a RAM 403, a storage 404, a communication device 405, an input device 406, a display device 407, a scanner device 408, and a printer device 409.

The CPU 401 controls all the pieces of hardware, and executes each of functions such as print and scan. The NVRAM 402 is a memory for data readout, and stores, for example, a basic control program of the image forming apparatus 100.

The RAM 403 is a data readable/writable memory, and is used, for example, as a working memory for the CPU 401. The storage 404 is used as a storage area for temporary data during execution of each program and permanent data.

The communication device 405 connects the image forming apparatus 100 to the LAN and the Internet, and enables data communication between apparatuses. The input device 406 is an operation unit for accepting text and data input operations by a user. Examples of the operation unit include a keyboard, a mouse, hardware keys, and a touch panel.

The display device 407 is a device for displaying various screens, and is, for example, a liquid crystal display or a touch panel. The user gives instructions on a user interface screen displayed on the display device 407 via the input device 406, and thus gives a job execution instruction to each of the image forming apparatuses 100 and 101.

The scanner device 408 is a device for scanning a document or the like placed on each of the image forming apparatuses 100 and 101 by the user, and converting the scanned document into electronic data. The printer device 409 is a device for printing electronic data. A card reader 410 is a device for reading an authentication card for authentication of logging into each of the image forming apparatuses 100 and 101.

Software Configuration of Image Forming Apparatus

Figure 5:
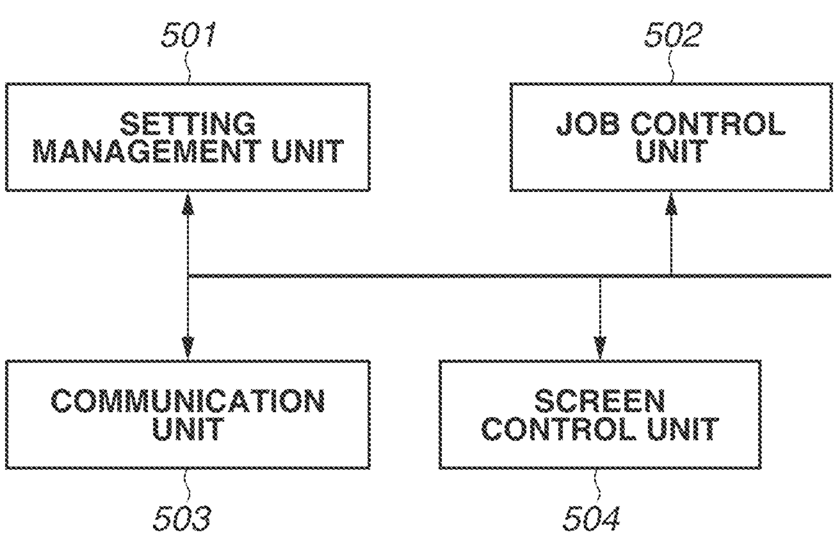
FIG. 5 is a block diagram illustrating a software configuration of the image forming apparatus.

FIG. 5 is a block diagram illustrating an example of a software configuration of the image forming apparatus 100. The software configuration is stored as a program in the NVRAM 402 described with reference to FIG. 4A, and is loaded into the RAM 403 for execution, and executed by the CPU 401.

A setting management unit 501 stores settings concerning execution of various functions of the image forming apparatus 100 into storage devices such as the RAM 403 and the storage 404, and reads out the settings from the storage devices. Examples of the settings here include copy settings for executing a copy function, print settings for executing a print function, network settings, and individual identification information.

A job control unit 502 executes various jobs by controlling the scanner device 408 and the printer device 409, based on job execution requests input in the input device 406 or received by a communication unit 503.

The communication unit 503 receives a print job and a job execution request from the printer management server 103. In addition, the communication unit 503 transmits and receives information such as apparatus information by communicating with the PCs 105 and 107.

A screen control unit 504 displays a screen on the display device 407, and accepts an instruction from the user via the input device 406.

Hardware Configuration of Client Terminal

Figure 8:
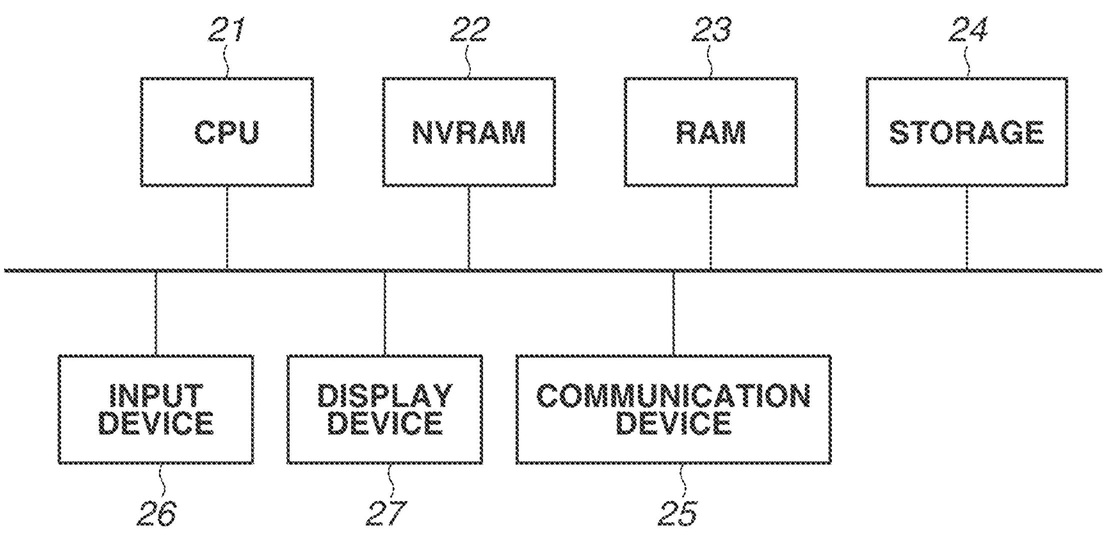
FIG. 8 is a block diagram illustrating a hardware configuration of a client terminal (personal computer (PC)).

FIG. 8 is a diagram illustrating an example of a hardware configuration of the PC 105.

The PC 105 includes a CPU 21, a NVRAM 22, a RAM 23, a storage 24, a communication device 25, an input device 26, and a display device 27.

The CPU 21 controls all the pieces of hardware, and executes each of functions, such as comparison of model type information of an apparatus such as the image forming apparatus 100, and setting of a device matching the comparison result as a printer to be used in a metaverse/application program.

The NVRAM 22 is a memory for data readout, and stores, for example, a basic control program of the PC 105.

The RAM 23 is a data readable/writable memory, and is used, for example, as a working memory for the CPU 21. The storage 24 is used as a storage area for temporary data during execution of each program and permanent data.

The communication device 25 connects the PC 105 to the LAN and the Internet, and enables data communication with apparatuses such as the VR headset 104 and the metaverse operation server 102. The input device 26 is an operation unit for accepting text and data input operations by the user. Examples of the operation unit include a keyboard, a mouse, hardware keys, and a touch panel.

The display device 27 is a device for displaying various screens, and is, for example, a liquid crystal display or a touch panel. The user gives instructions on a user interface screen displayed on the display device 27 via the input device 26.

Hardware Configuration of Server

Figure 6:
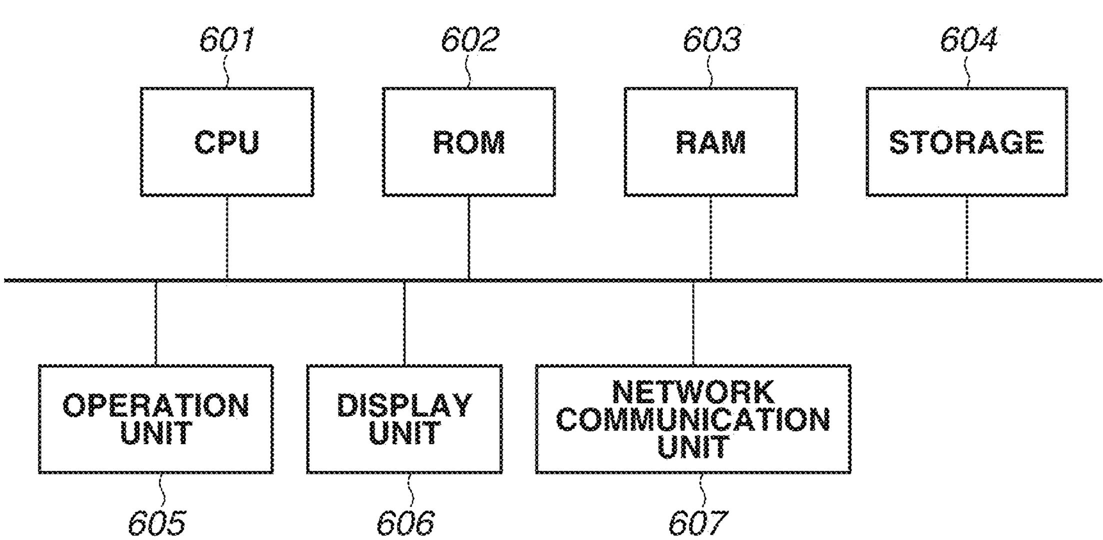
FIG. 6 is a block diagram illustrating a hardware configuration of a server.

FIG. 6 is a diagram illustrating an example of a hardware configuration of a server. Here, the metaverse operation server 102 will be described. The metaverse operation server 102 includes a CPU 601, a ROM 602, a RAM 603, a storage 604, an operation unit 605, a display unit 606, and a network communication unit 607.

The CPU 601 is a central processing unit for controlling each unit of the metaverse operation server 102. The ROM 602 is a read only memory for storing a boot program for system startup. The RAM 603 plays a role as a work memory to be used when a program is executed by the CPU 601. The storage 604 is a device for storing programs to be executed by the CPU 601 and various kinds of information.

The operation unit 605 includes a keyboard, a mouse, and the like for a user to perform various input operations. The display unit 606 is a device for displaying various kinds of information, and is, for example, a liquid crystal display. The network communication unit 607 is connected to a network such as the Internet, and performs various communications.

The printer management server 103 has a hardware configuration similar to the hardware configuration of the metaverse operation server 102, and thus the description thereof will be omitted. However, the printer management server 103 may have a hardware configuration different from the hardware configuration of the metaverse operation server 102.

Software Configuration of Metaverse Operation Server

Figure 7A:
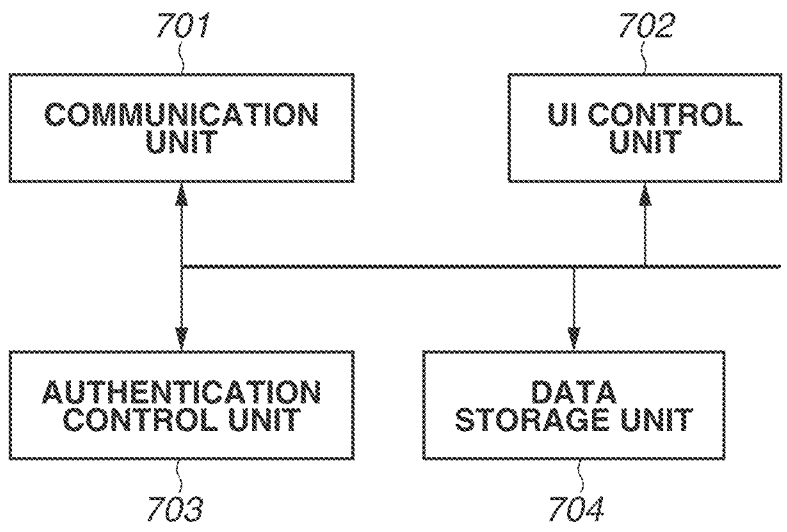
FIG. 7A is a block diagram illustrating a software configuration of a metaverse operation server.

FIG. 7A is a diagram illustrating an example of a software configuration of the metaverse operation server 102. The software configuration is stored as a program in the ROM 602 described with reference to FIG. 6, and is loaded into the RAM 603 for execution, and executed by the CPU 601.

A communication unit 701 communicates with the PC 105, the image forming apparatus 100, and the printer management server 103, and transmits and receives each processing request. A user interface (UI) control unit 702 controls a UI displayed by the PC 105. The UI control unit 702 creates information about a virtual object such as a metaverse space and transmits the information to the PC 105 via the communication unit 701.

An authentication control unit 703 performs user management using a user authentication function. User information is stored in a data storage unit 704 or a user-management-dedicated database (not illustrated). Alternatively, the authentication control unit 703 may cooperate with an external authentication service. The user information in the authentication control unit 703 includes use permission information for each user to use the image forming apparatus from the metaverse operation server 102. As to this use permission information, a user can be given a use permission as a temporary charge user by paying a charge in the metaverse operation server 102.

The data storage unit 704 stores data in response to a request from the authentication control unit 703. The data storage unit 704 also stores information for creating a virtual object such as a metaverse space.

Software Configuration of Printer Management Server

Figure 7B:
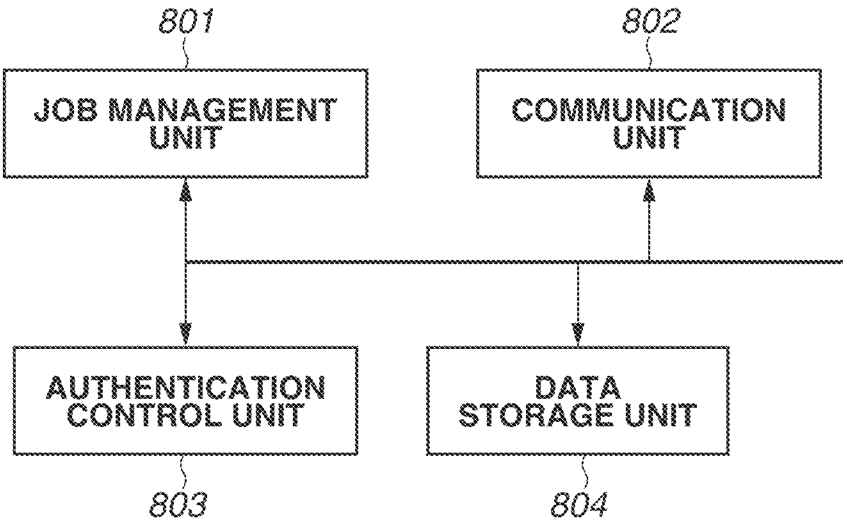
FIG. 7B is a block diagram illustrating a software configuration of a printer management server.

FIG. 7B is a diagram illustrating an example of a software configuration of the printer management server 103.

The software configuration is stored as a program in the ROM 602 described with reference to FIG. 6, and is loaded into the RAM 603 for execution, and executed by the CPU 601.

A job management unit 801 stores a print job received from the metaverse operation server 102 into a data storage unit 804.

A communication unit 802 communicates with the image forming apparatus 100, the metaverse operation server 102, and the PC 105, and transmits and receives each processing request.

An authentication control unit 803 performs user management. The user information is stored in the data storage unit 804 or a user-management-dedicated database (not illustrated). Alternatively, the authentication control unit 803 may cooperate with an external authentication service.

The data storage unit 804 stores data in response to a request from the job management unit 801 or the authentication control unit 803.

An example of a method of printing a printout in a VR space by operating the image forming apparatus 100 using the VR headset 104 in FIG. 1 in the first exemplary embodiment will be described.

When a user selects a multi-function peripheral (MFP) icon in the VR space after logging into the VR space using the PC 105, the metaverse operation server 102 asks the user which image forming apparatus is an image forming apparatus to be associated with the MFP icon, via the PC 105.

Figure 9:
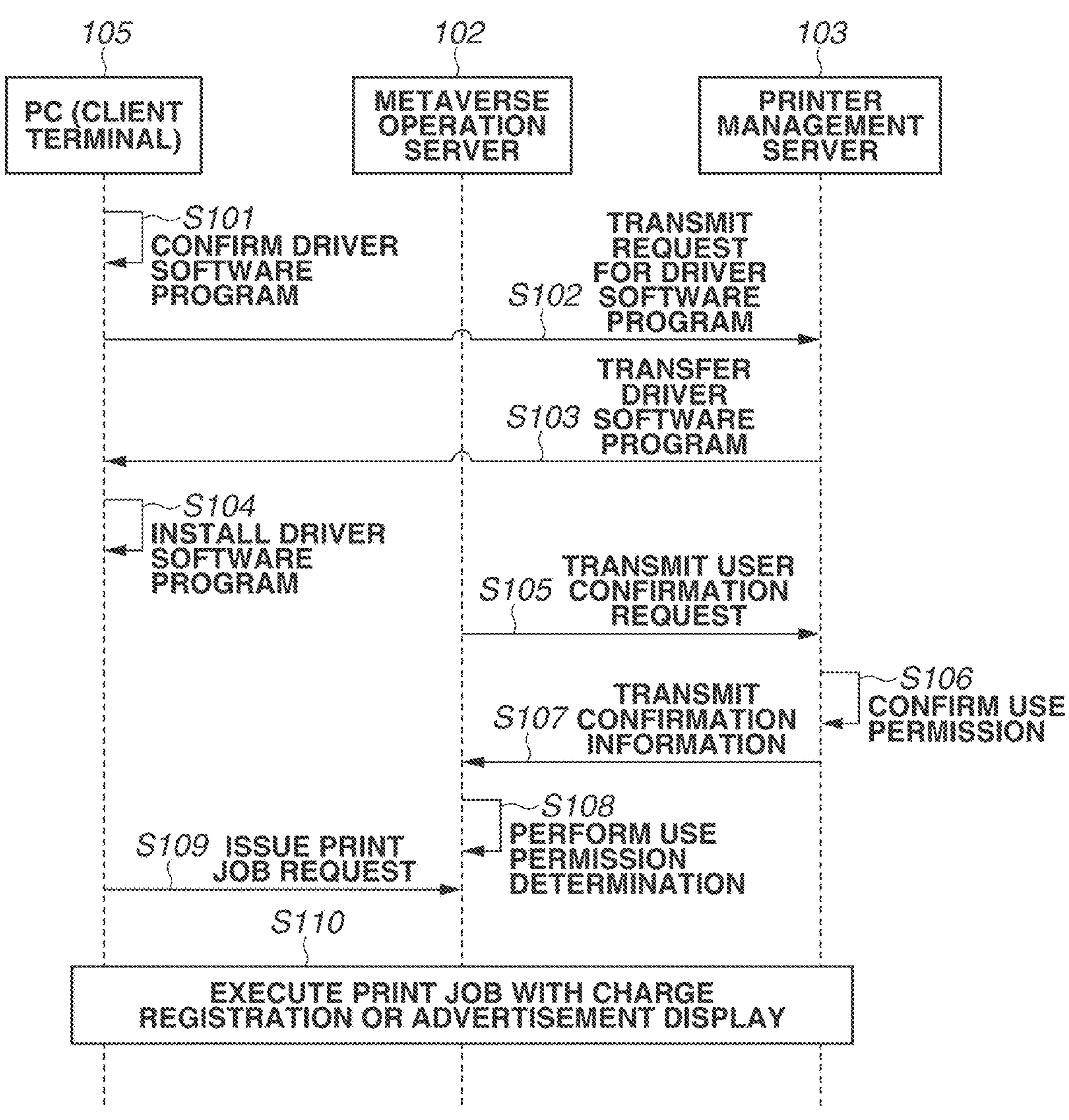
FIG. 9 is a diagram illustrating a data communication flow of the client terminal (PC), the metaverse operation server, and the printer management server.

When the user selects the image forming apparatus 100 nearby, the PC 105 exchanges the user information with the metaverse operation server 102 and the printer management server 103, as illustrated in FIG. 9. The PC 105 may register information of the image forming apparatus 100 to be associated with the PC 105 beforehand, so that association with the image forming apparatus 100 may be automatically executed when the above-described MFP icon is selected.

In step S101, the PC 105 confirms whether a driver software program for execution of print and scan of the image forming apparatus 100 is installed. In a case where the driver software program is not installed, in step S102, the PC 105 transmits a request for the driver software program for execution to the printer management server 103. Upon receiving the request for the driver software program for execution, in step S103, the printer management server 103 transfers the driver software program for execution to the PC 105. Upon receiving the driver software program for execution, in step S104, the PC 105 installs the driver software program for execution. Although not illustrated, if the driver software program for execution is already installed in step S101, step S102 to step S104 are skipped.

In step S105, the metaverse operation server 102 transmits a user confirmation request for confirming whether the user of the PC 105 is registered in the printer management server 103 as a user. Upon receiving the request transmitted in step S105, in step S106, the printer management server 103 confirms whether the user using the PC 105 can be permitted to use the image forming apparatus 100, and, in step S107, transmits confirmation information to the metaverse operation server 102.

In step S108, the metaverse operation server 102 performs use permission determination, based on the information acquired in step S107 and the user information for the PC 105 stored in the authentication control unit 703. In a case where the metaverse operation server 102 determines that charge registration or advertisement display is desirable in step S108, in step S109, the PC 105 issues a print job request to the metaverse operation server 102 when the user gives an instruction to execute a print job using the MFP icon. In response to the print job request, in step 110, the print job is executed. It is not necessary to perform the operations in step S101 to step S104 and the operations in step S105 to step S108 in the order as in the present exemplary embodiment, and may be performed in parallel.

Here, the use permission (user authentication) for the image forming apparatus 100 in step S106 is performed in two stages. The first stage (first authentication) is a stage in which user registration for the image forming apparatus has been performed and the user is permitted to use the image forming apparatus anytime. The second stage (second authentication) is a stage in which user registration has not been performed but the user is temporarily permitted to use the image forming apparatus under a specific condition such as payment of a charge (completion of a charge payment process).

The user can use the image forming apparatus 100 without advertisement display, in a state where the use permission of the first stage is obtained in step S106, and in a state where the use permission of the second stage is obtained in step S106.

However, even in a case where the use permission of the second stage in step S106 is obtained, and the user is not registered as a paid user in the metaverse operation server 102, it is possible to use the image forming apparatus 100 temporarily by performing charge registration or advertisement display. Here, the paid users registered in the metaverse operation server 102 include a registered user (subscriber) who has paid a usage charge for a fixed period of time beforehand, and a registered user who has paid a usage charge for a fixed period of time/a fixed number of times for use of an MFP icon for print or the like. In addition, even if the user is not registered as a paid user in the metaverse operation server 102, in a case where the user operates the image forming apparatus 100 in a VR meeting room for which registration has been made as a paid user of the image forming apparatus 100, a manager of the VR meeting room may temporarily give the same authority to the user who has entered the VR meeting room.

The printer management server 103 holds, for example, the presence/absence of the use permission of the first stage and the presence/absence of the use permission of the second stage, in association with a user identification (ID). The method of confirming the use permission is, for example, a method of accepting a user ID in the user confirmation request from the metaverse operation server 102, and comparing the accepted user ID with the held information. In a case where the driver software program is installed, the user selects an icon of the image forming apparatus 100 in the VR headset 104 between step S104 and step S105, so that the transmission of the user confirmation request in step S105 is executed.

Figure 10:
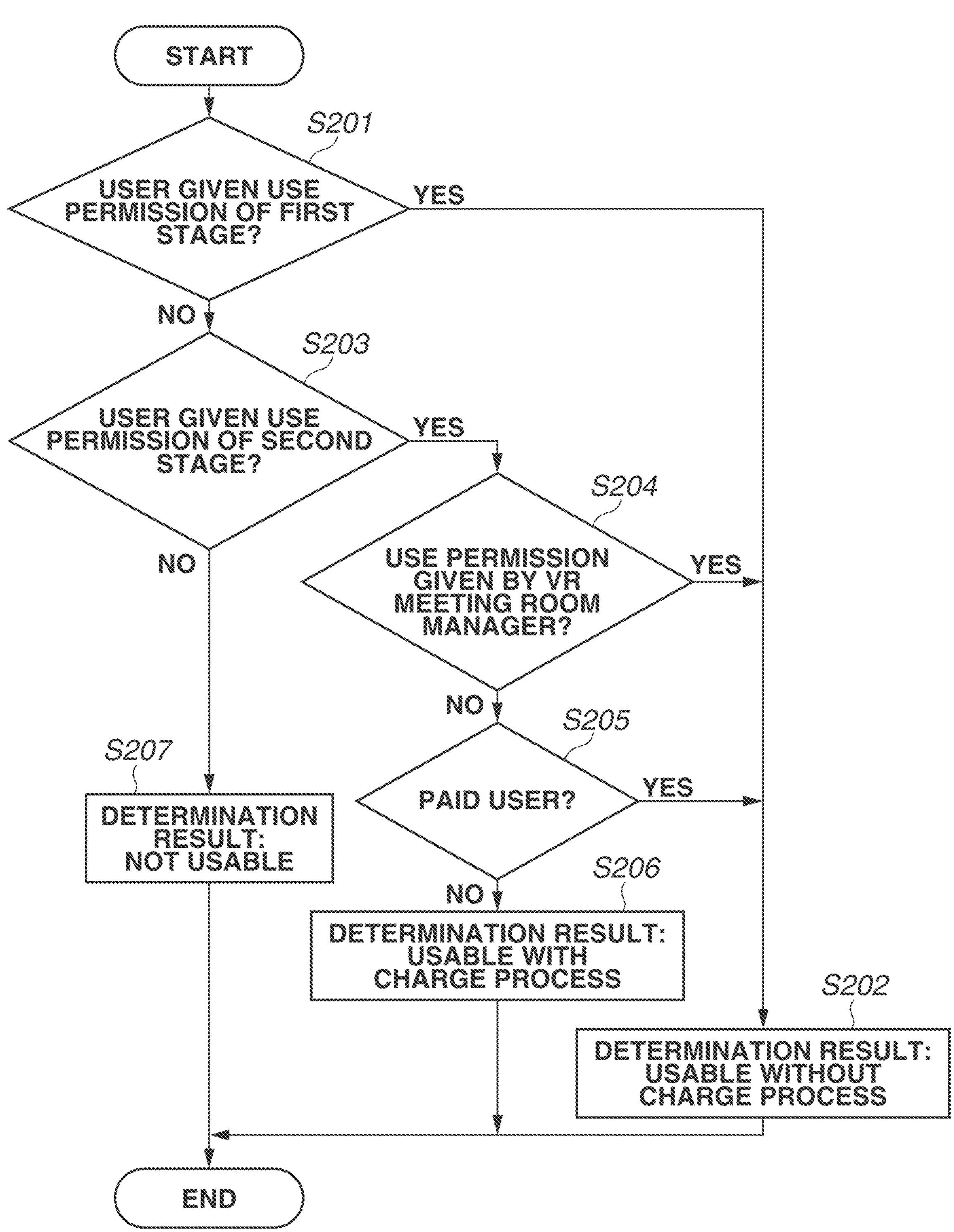
FIG. 10 is a flowchart illustrating advertisement display determination processing.

FIG. 10 is a flowchart illustrating processing of the use permission determination in step S108.

First, in step S201, the metaverse operation server 102 determines whether the user who has logged into the PC 105 is a user given the use permission of the first stage to use the image forming apparatus 100, based on the result of the confirmation in step S106. In a case where the result of the determination is positive (YES in step S201), the processing proceeds to step S202. In step S202, the metaverse operation server 102 determines that the user who has logged into the PC 105 is a user allowed for use without a charge process, and the processing in this flowchart ends. In a case where the result of the determination is negative (NO in step S201), the processing proceeds to step S203. In step S203, the metaverse operation server 102 determines whether the user who has logged into the PC 105 is a user given the use permission of the second stage to use the image forming apparatus 100.

In a case where the result of the determination is positive (YES in step S203), the processing proceeds to step S204. In step S204, the metaverse operation server 102 confirms whether the user is given a use permission to use the image forming apparatus 100 by a VR meeting room manager. In a case where the result of the determination is positive (YES in step S204), the processing proceeds to step S202 in which the metaverse operation server 102 determines that the user is a user allowed for use without a charge process. In a case where the result of the determination is negative (NO in step S204), the processing proceeds to step S205. In step S205, the metaverse operation server 102 determines whether the user is a user registered in the metaverse operation server 102 as a paid user. The user registered as a paid user refers to a user who has purchased a license to use the image forming apparatus in the metaverse space, for a specific period of time, or for a specific number of times.

In step S205, the metaverse operation server 102 confirms whether the above-described license to use the image forming apparatus 100 is registered with account information of the user. In a case where the result of the determination is positive (YES in step S205), the processing proceeds to step S202 in which the metaverse operation server 102 determines that the user is a user allowed for use without a charge process, and the processing in this flowchart ends.

In a case where the result of the determination is negative (NO in step S205), the processing proceeds to step S206. In step S206, the metaverse operation server 102 determines that the image forming apparatus 100 can be used if a condition is satisfied, and the processing in this flowchart ends. Here, examples of the condition include a charge process by a user, and viewing an advertisement moving image.

On the other hand, in a case where the result of the determination in step S203 is negative (NO in step S203), the processing proceeds to step S207. In step S207, the metaverse operation server 102 determines that the image forming apparatus 100 cannot be used, and the processing in this flowchart ends. In a case where the determination in step S207 is made, the print job request in step S109 in FIG. 9 is not accepted. In other words, step S109 and step S110 are not performed. Specifically, in a case where the determination in step S207 is made, information indicating that the image forming apparatus 100 cannot be used is displayed on the VR headset 104, although not illustrated in the present exemplary embodiment.

FIG. 11A illustrates a flow of display in the VR headset in step S110 after the determination in step S206 is made. Each screen displayed here is a screen that can be operated.

The CPU 201 controls the display in this flow. The VR headset 104 projects advertisement information transmitted from the metaverse operation server 102 to the PC 105, for the user. A user operation, i.e., an input to the VR headset 104, is transmitted to the metaverse operation server 102 and the printer management server 103 via the PC 105.

Figures 12A, 12B, 12C:
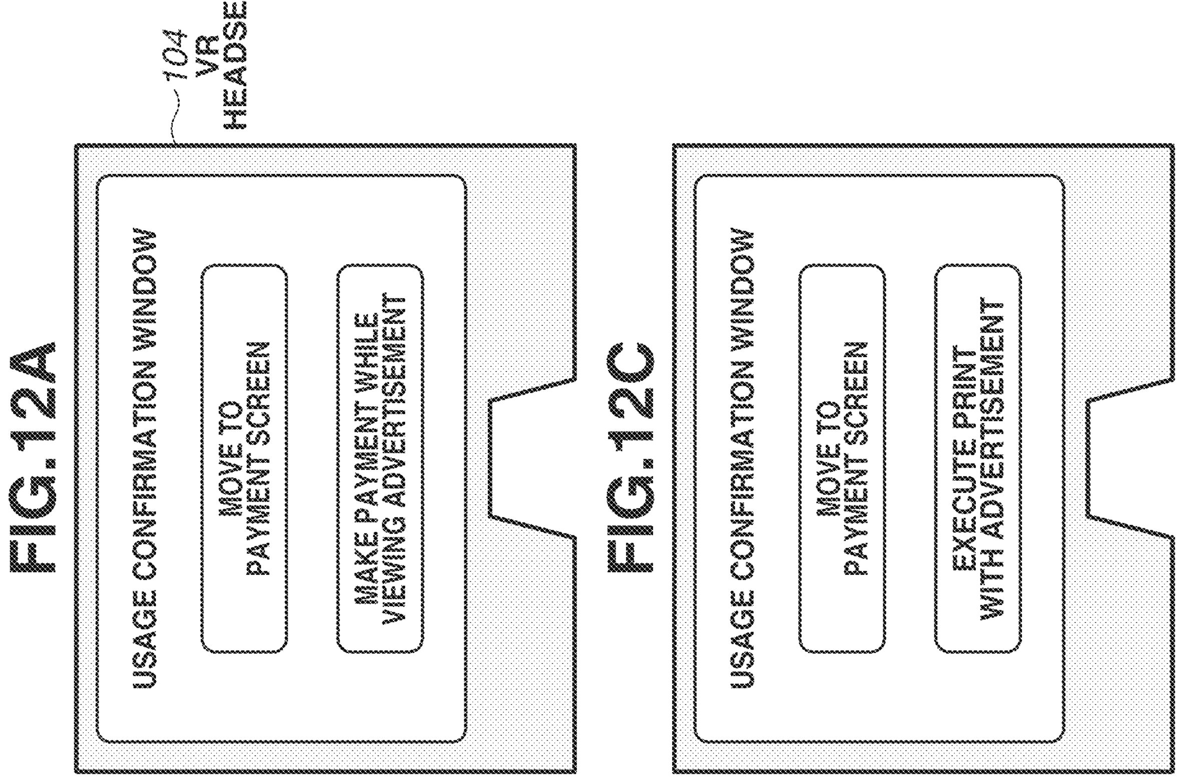
FIGS. 12A, 12B, and 12C are diagrams each illustrating a display example of the VR headset.

In step S302, when the MFP icon is selected, the VR headset 104 displays a screen in which a usage (a predetermined condition) of the image forming apparatus can be selected, as illustrated in FIG. 12A.

Specifically, the VR headset 104 displays a usage-charge payment confirmation screen for selecting the payment of a usage charge for the image forming apparatus in the metaverse space, or the display of an advertisement. In a case where the user selects the payment of the usage charge for the image forming apparatus 100 in the metaverse space (YES in step S303), the processing proceeds to step S304. In step S304, the VR headset 104 displays a payment screen in the metaverse space as illustrated in FIG. 12B.

To pay the usage charge, the user selects one from a license pack for a limited period of time (e.g., one week) in the metaverse space, a license pack for a limited number of times (e.g., ten times) in the metaverse space, and a license to use the image forming apparatus only for this time, and the selected option is accepted. In step S305, the VR headset 104 accepts payment of the usage charge corresponding to the selected license.

For example, a payment means such as points or a credit card that can be used in the metaverse space is used as the way of payment in step S305. The types of license to use the image forming apparatus and the payment means for the usage charge are not limited to those described above. For example, the license to use the image forming apparatus may be set for the number of printed sheets, instead of the number of print times. The payment means for the usage charge of the license may be a type in which future payment is set at the point of purchase and the charge is paid later through a financial institution such as a bank, and may be other means for use license setting and usage charge payment.

In a case where the user selects the advertisement display in the usage-charge payment confirmation screen (NO in step S303), the processing proceeds to step S306. In step S306, the VR headset 104 displays an advertisement window in a form of still image or moving image, as illustrated in FIG. 13A.

Figures 13A, 13B, 13C, 13D:
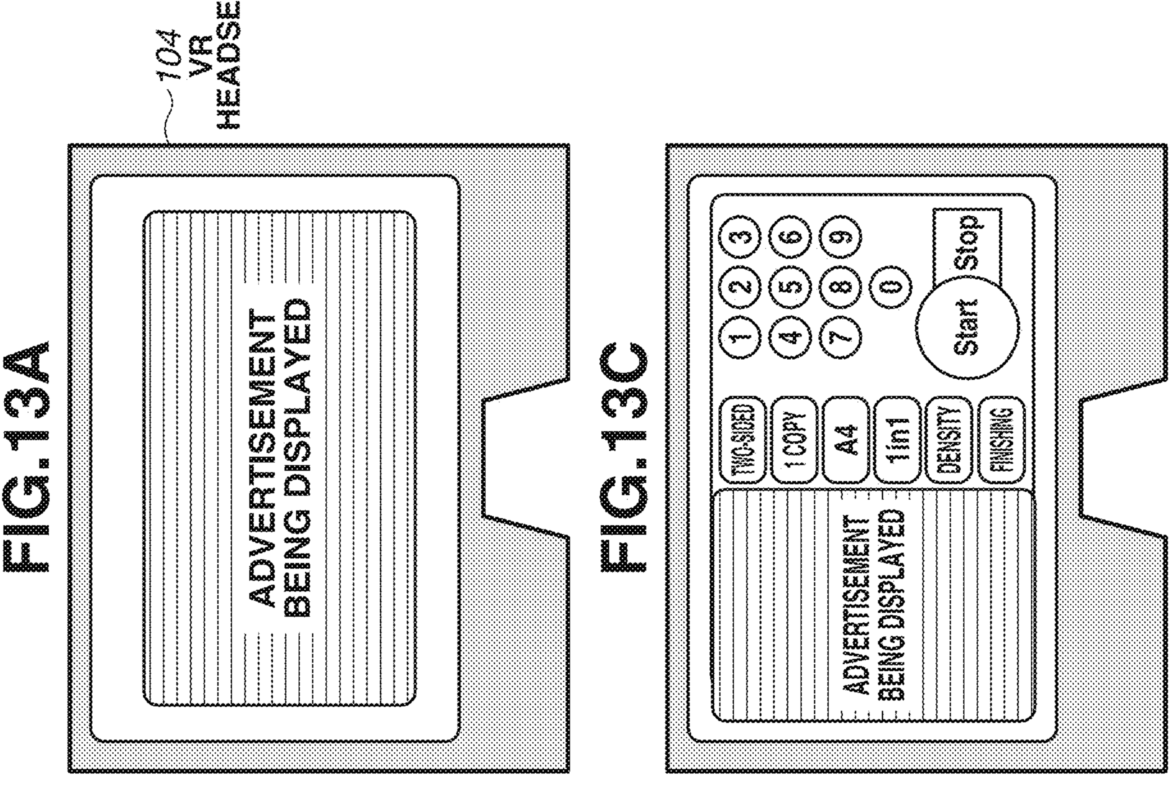
FIGS. 13A to 13D are diagrams each illustrating an advertisement display example of the VR headset.

In step S307, after the usage charge payment by the user or the advertisement display, the VR headset 104 displays an operation window for operating the image forming apparatus 100 in a manner overlapping the MFP icon as illustrated in FIG. 13B. The operation window displayed here is an operation window to be used for instructing the image forming apparatus 100 to perform a print process.

In step S308, settings input by the user in the operation window of the image forming apparatus 100 are accepted. Then, in step S309, the VR headset 104 displays a print preview window reflecting the setting information. In step S310, the press of a print execution button by the user is accepted. Subsequently, in step S311, the print job is transmitted from the metaverse operation server 102 to the image forming apparatus 100 and executed, and the operation using the MFP icon ends.

In the advertisement display using the still or moving image in step S306, information in the VR space during the advertisement display cannot be confirmed. Therefore, it is also possible to skip step S306, and display an advertisement window at a corner of the operation window of the image forming apparatus 100 in step S307, as illustrated in FIG. 13C. However, in the advertisement display in FIG. 13C, an advertisement display time can be insufficient, in a case where operating the image forming apparatus 100 in step S307 is finished in a short time. In that case, the advertisement window is continuously displayed for a certain period of time at a corner of a VR space rendering screen as illustrated in FIG. 13D, so that the advertisement display time can be secured.

Step S303, step S304, step S305, and step S306 may be executed before the print preview window display in step S309, i.e., after the user operates the image forming apparatus 100 to input the settings in step S308.

In a case where the payment is selected in step S303, an advertisement is not displayed in the screen in each of step S307 to step S311. Meanwhile, FIG. 11B illustrates a flow of display in the VR headset in step S110, after the determination in step S202 is made. In a case where the user determined in step S202 selects the MFP icon, step S302 to step S305 or step S306 are not executed. In this case as well, an advertisement is not displayed in the screen in each of step S307 to step S311.

In a case where the image forming apparatus 100 has a function to be used only by a paid user such as an advanced image processing function, available functions of the image forming apparatus 100 may vary between the user determined in step S202 and the user determined in step S206. In that case, the operation window may be changed, for example, by graying out a button for such a function in the operation window of the image forming apparatus 100 for the user determined in step S206.

In the present exemplary embodiment, the method of displaying the advertisement during the setting and execution of the print job using the image forming apparatus 100 in step S109 to step S110 has been described. However, the advertisement may be displayed during an operation on the image forming apparatus 100, such as viewing or editing of a file stored in the storage 404 in the image forming apparatus 100.

The advertisement display time and the usage charge for the image forming apparatus may be set differently between the image forming apparatus 100 and the image forming apparatus 101. For example, in the image forming apparatus 101, an advertisement display time (e.g., 45 seconds) longer than an advertisement display time (e.g., 30 seconds) of the image forming apparatus 100 can be set, in a case where a running cost is high compared with the image forming apparatus 100. However, the advertisement display time and the usage charge for the image forming apparatus are not necessarily affected by the amount of the running cost described in this example, and may be freely set by the operator of the image forming apparatus. The metaverse operation server 102 may obtain information about the usage charge for each of the image forming apparatuses from the printer management server 103 beforehand, and may freely set the advertisement display time according to the usage charge for each of the image forming apparatuses.

In a second exemplary embodiment, a method in which the advertisement displayed on the VR headset 104 in the first exemplary embodiment is displayed on a printout of the image forming apparatus 100 will be described.

As with the first exemplary embodiment, the PC 105, the metaverse operation server 102, and the printer management server 103 cooperate with each other as illustrated in FIG. 9, and the advertisement display determination and the like are similar to step S108 of the first exemplary embodiment, and therefore, description of parts other than the difference will be omitted.

Figure 14:
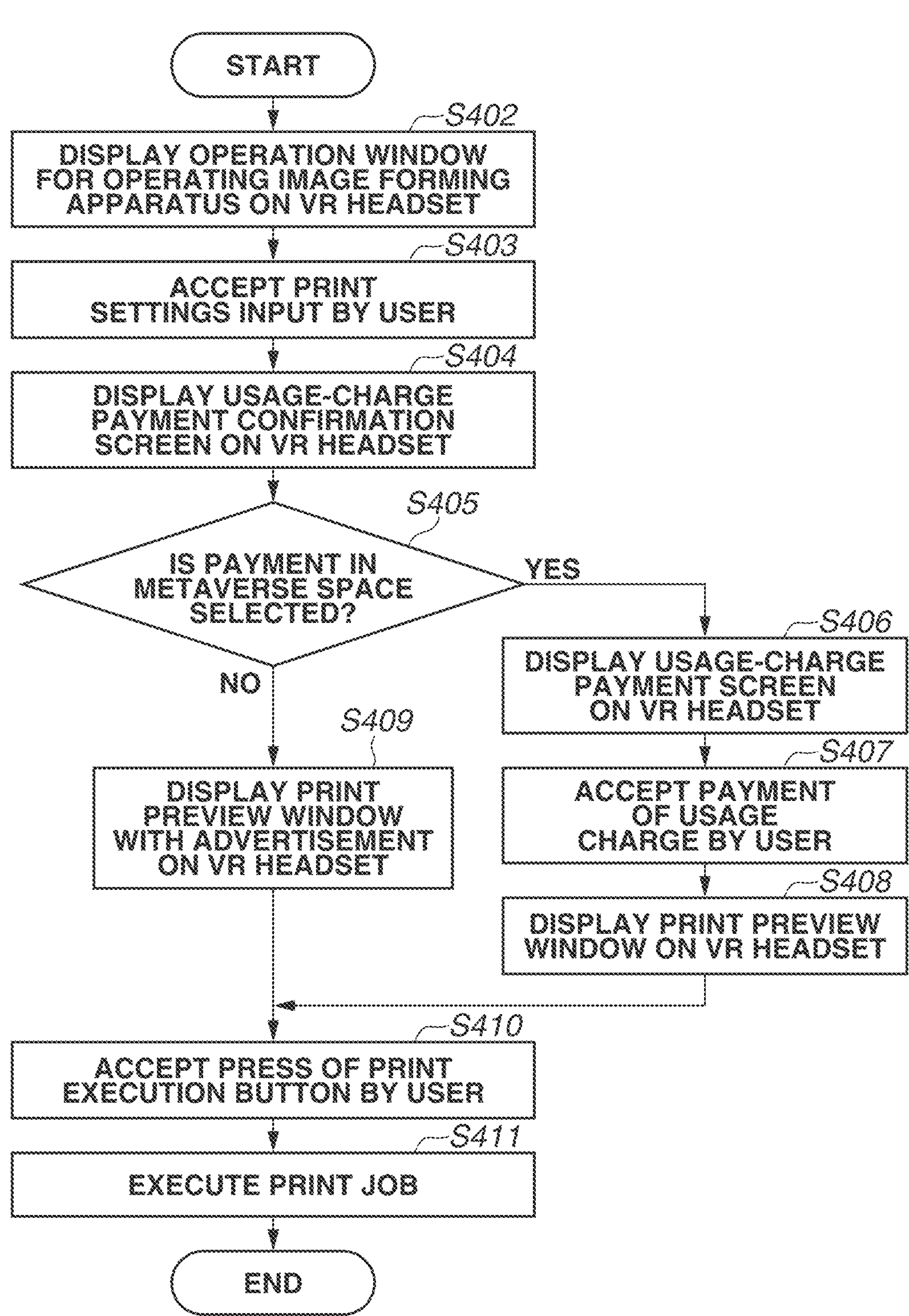
FIG. 14 is a diagram illustrating a flow of display in the VR headset.

The difference is a flow (FIG. 14) of display in the VR headset during the print job execution in step S110. Therefore, a case where the determination result in step S206 is obtained in FIG. 9 will be described. A case where the determination result in step S202 is obtained is similar to the first exemplary embodiment.

In step S402, when the MFP icon is selected, the VR headset 104 displays an operation window of the image forming apparatus 100 in a manner overlapping the MFP icon as illustrated in FIG. 13B. Then, in step S403, the VR headset 104 accepts input of settings in the operation window of the image forming apparatus 100.

In step S404 following step S403, the VR headset 104 displays a screen for selecting a usage of the image forming apparatus as illustrated in FIG. 12C, in a manner similar to step S302. In a case where selection of the payment of the usage charge for the image forming apparatus in the metaverse space is accepted (YES in step S405), the processing proceeds to step S406. In step S406, the VR headset 104 displays a payment screen in the metaverse space as illustrated in FIG. 12B, in a manner similar to step S304.

Then, in step S407, the payment of the usage charge for the image forming apparatus is accepted in a manner similar to step S305. In step S408, the VR headset 104 displays a print preview window reflecting the setting information in a manner similar to step S309. In a case where execution of print with an advertisement is selected (NO in step S405), the processing proceeds to step S409. In step S409, the VR headset 104 displays a print preview window in which a document file reflecting the setting information and an advertisement are combined.

Figure 15A:
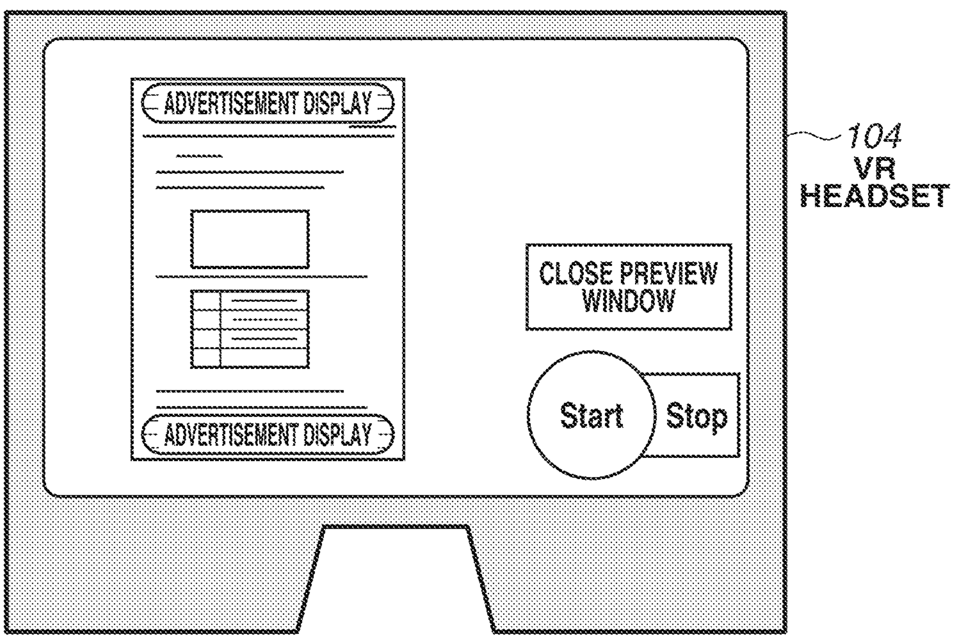
FIGS. 15A and 15B are diagrams each illustrating a display example of the VR headset.
Figure 15B:
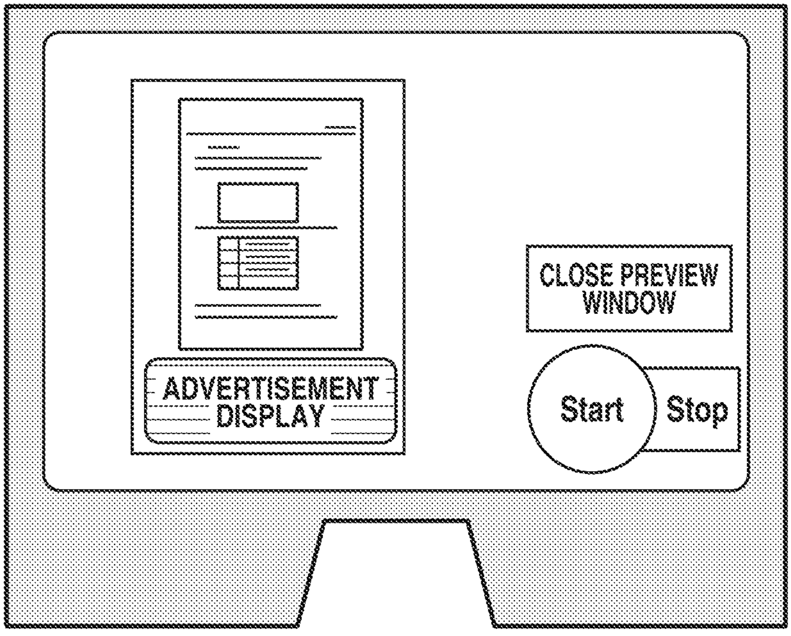

In the print preview window combined with the advertisement, an advertising message may be added to a header portion and a footer portion of the document file located at the center, as illustrated in FIG. 15A. Alternatively, a display portion for the document file may be reduced and an advertisement display area may be placed in the print preview window, as illustrated in FIG. 15B.

Although not illustrated, a print preview window displaying the document file to be printed on the front side and the advertisement to be printed on the back side may be displayed. In step S410, the print execution button is pressed if everything is satisfactory, and this press is accepted. In step S411, the print job is transmitted from the metaverse operation server 102 to the image forming apparatus 100 and executed, and the operation using the MFP icon ends.

Step S404, step S405, step S406, and step S407 may be performed before the operation window of the image forming apparatus 100 is displayed in step S402. In that case, after the input of the print settings for the image forming apparatus 100 in step S403, the print preview window in step S408 or step S409 is displayed based on user selection corresponding to step S405.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™M), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-185373, filed Nov. 21, 2022, which is hereby incorporated by reference herein in its entirety.

What is claimed is:

1. A virtual reality system comprising:

a virtual reality headset including a display device that displays at least a virtual reality video and an imaging device that captures images at a predetermined range including a view of a user;

a virtual video server configured to control the virtual reality video;

an image forming apparatus; and a management server configured to communicate with the image forming apparatus and the virtual video server, wherein the virtual video server is configured to:

determine whether user registration for the image forming apparatus has been performed in the management server;

if the user registration for the image forming apparatus has been performed in the management server, determine that use of the image forming apparatus is permitted based on the user registration for the image forming apparatus in the management server; and if the user registration for the image forming apparatus has not been performed in the management server, determine that satisfaction of a predetermined condition is required to use the image forming apparatus, and wherein the virtual reality headset is configured to:

transmit, to the virtual video server, a request to use the image forming apparatus based on an input to the virtual reality headset; and responsive to the request to use the image forming apparatus:

if the virtual video server determined that use of the image forming apparatus is permitted, display a user interface for operating the image forming apparatus without satisfaction of the predetermined condition; and if the virtual video server determined that satisfaction of the predetermined condition is required to use the image forming apparatus:

display one or more screens enabling the predetermined condition to be satisfied based on one or more inputs to the virtual reality headset; and display the user interface for operating the image forming apparatus based on satisfaction of the predetermined condition.

2. The virtual reality system according to claim 1, wherein the virtual video server is further configured to:

obtain information indicating that permission to use a system using the image forming apparatus in the virtual reality system has been given; and determine that use of the image forming apparatus is permitted based on the permission to use the system using the image forming apparatus in the virtual reality system.

3. The virtual reality system according to claim 2, wherein the permission is obtained based on a payment process for paying a charge for the system using the image forming apparatus in the virtual reality system being completed.

4. The virtual reality system according to claim 3, wherein the payment process is a payment process by subscription.

5. The virtual reality system according to claim 3, wherein the payment process is a payment process by a license pack for a limited period of time or a limited number of times.

6. The virtual reality system according to claim 1, wherein the predetermined condition is to newly accept a payment process for paying a charge for a system using the image forming apparatus in the virtual reality system.

7. The virtual reality system according to claim 1, wherein the predetermined condition is to display an advertisement in the user interface for operating the image forming apparatus.

8. The virtual reality system according to claim 7, wherein the user interface for operating the image forming apparatus is displayed based on selection of an icon of the image forming apparatus in the virtual reality video.

9. The virtual reality system according to claim 7, wherein the user interface for operating the image forming apparatus is a user interface for instructing the image forming apparatus to perform a print process.

10. The virtual reality system according to claim 7, wherein the user interface for operating the image forming apparatus is a preview window displayed in a case where the image forming apparatus is instructed to perform a print process.

11. The virtual reality system according to claim 7, wherein the advertisement is a moving image or a still image.

12. The virtual reality system according to claim 1, wherein one of advertisement display and new execution of a charge payment process in the virtual reality system is selectable as the predetermined condition on the one or more screens, based on selection of an icon of the image forming apparatus in the virtual reality video.

13. The virtual reality system according to claim 1, wherein the management server is configured to hold a user identification (ID) and information about permission to use the image forming apparatus in association with each other, the information about the permission to use the image forming apparatus including information related to the user registration for the image forming apparatus in the management server.

14. The virtual reality system according to claim 13, wherein the management server is further configured to:

receive, from the virtual video server, a user ID and a confirmation request for confirming whether a user is registered in the management server and permitted to use the image forming apparatus, the confirmation request being based on a selection of an icon of the image forming apparatus in the virtual reality headset;

determine whether the received user ID matches the held user ID by comparing the received user ID with the held user ID; and transmit information in response to the confirmation request to the virtual video server, wherein if the received user ID matches the held user ID, the information transmitted in response to the confirmation request is based on the information about the permission to use the image forming apparatus held in the management server in association with the held user ID.

* * * * *